S. B. Stewart,
Horse Collar,
Nº 39,076. Patented June 30, 1863.

Witnesses:
J. Snowden Bell
A. Brooke Jones

Inventor:
Saml. B. Stewart
by his Attorney
Wm. D. Baldwin

UNITED STATES PATENT OFFICE.

SAMUEL B. STEWART, OF CENTRE TOWNSHIP, INDIANA COUNTY, PA.

COMBINED COLLAR AND HAMES FOR HORSES.

Specification forming part of Letters Patent No. 39,076, dated June 30, 1863.

*To all whom it may concern:*

Be it known that I, SAMUEL B. STEWART, of Centre Township, in the county of Indiana and State of Pennsylvania, have invented a certain new and useful Improvement in Collars and Hames, of which the following is a full, clear, and exact description, reference being had to the accompanying drawings, which make part of this specification, and in which—

Figure 1:
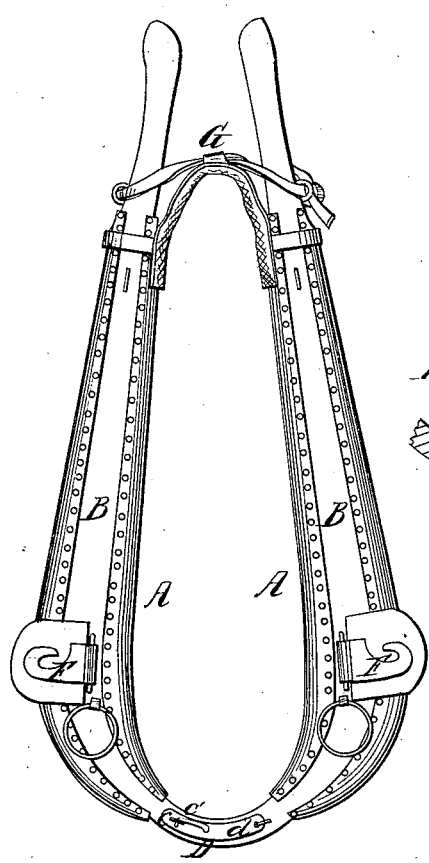
Figure 3:
Figure 2:
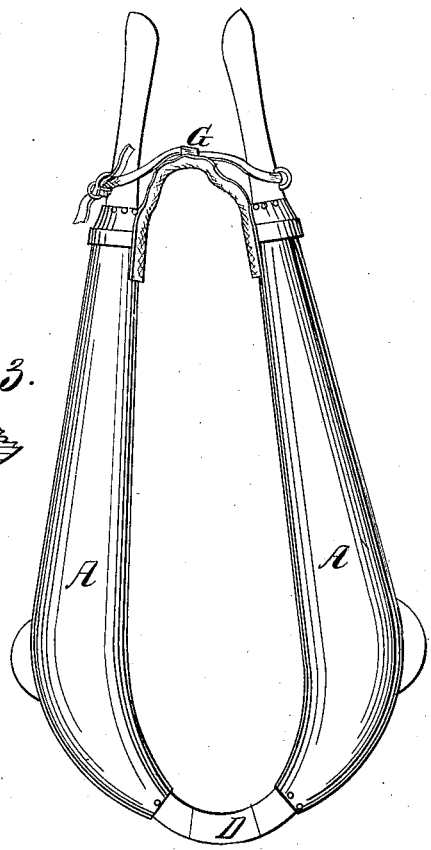

Figure 1 represents a view in elevation of my improved combined collar and hames, as seen from the front; Fig. 2, a similar view of the same, as seen from the rear; and Fig. 3, a vertical longitudinal section through the lower portion of the same.

The improvements claimed under this patent consist, first, in combining the collar and hames, as hereinafter described, so that they may form but one piece, instead of being separate, as heretofore; secondly, in combining a tenon on one hame with a mortise and detent on the other, to fasten the two sides of the collar and hames together.

In the accompanying drawings the casing A of the collar is shown as fastened directly to the hames B, which may be of any suitable material and suitably stuffed. A tenon, C, is formed on the lower end of one of the hames, and a ferrule, D, forming a mortise, secured upon the other. A strap, d, secured upon one of the hames, passes over a staple, c, on the other, and is secured by a hook, c', in order to lock the lower ends of the collar and hames together. The traces may be attached to tug-hooks F upon the hames. A strap, G, connects the upper portion of the hames together. The leather is shown in the drawings as tacked to the harness; but it might be made to overlap them completely and be sewed upon them.

What I claim as my invention, and desire to secure by Letters Patent, is—

1. The combination of the collar A and hames B, substantially as described, so that they shall form but one piece, as set forth.

2. The combination of the tenon C, ferrule D, strap d, staple c, and hook c', as described, for the purpose of uniting the two sides of the collar, as set forth.

In testimony whereof I have hereunto subscribed my name.

S. B. STEWART.

Witnesses:
 JOS. SNOWDEN BELL,
 EDM. F. BROWN.